United States Patent
Jester et al.

(10) Patent No.: US 10,719,915 B2
(45) Date of Patent: Jul. 21, 2020

(54) METHOD AND APPARATUS FOR DETERMINING A DEFOCUSING VALVE AND FOR IMAGE-BASED DETERMINATION OF A DIMENSIONAL SIZE

(71) Applicant: CARL ZEISS INDUSTRIELLE MESSTECHNIK GMBH, Oberkochen (DE)

(72) Inventors: Philipp Jester, Heidenheim (DE); Oliver Schwarz, Rainau (DE); Michael Totzeck, Schwaebisch Gmuend (DE); Matthias Barnert, Jena (DE); Dirk Doering, Erfurt (DE); Rainer Schmidt, Jena (DE)

(73) Assignee: CARL ZEISS INDUSTRIELLE MESSTECHNIK GMBH, Oberkochen (DE)

( * ) Notice: Subject to any disclaimer, the term of this patent is extended or adjusted under 35 U.S.C. 154(b) by 415 days.

(21) Appl. No.: 15/439,150

(22) Filed: Feb. 22, 2017

(65) Prior Publication Data
US 2017/0249722 A1 Aug. 31, 2017

(30) Foreign Application Priority Data
Feb. 29, 2016 (DE) .................. 10 2016 203 275

(51) Int. Cl.
*G06T 7/00* (2017.01)
*G06T 5/00* (2006.01)
*G06T 7/73* (2017.01)

(52) U.S. Cl.
CPC ............ *G06T 5/002* (2013.01); *G06T 7/0002* (2013.01); *G06T 7/73* (2017.01); *G06T 2207/10024* (2013.01); *G06T 2207/30168* (2013.01)

(58) Field of Classification Search
CPC ......... G06T 5/002; G06T 7/73; G06T 7/0002; G06T 2207/10024; G06T 2207/30168
See application file for complete search history.

(56) References Cited

U.S. PATENT DOCUMENTS

| 6,493,097 B1 | 12/2002 | Ivarsson |
| 6,714,303 B2 | 3/2004 | Ivarsson |

(Continued)

FOREIGN PATENT DOCUMENTS

| DE | 30 33 260 A1 | 3/1981 |
| DE | 10 2005 006 724 A1 | 8/2006 |

(Continued)

OTHER PUBLICATIONS

M. Atif et al.; Optimal Depth Estimation from a Single Image by Computational Imaging Using Chromatic Aberrations; Oct. 2013; pp. 343-348.

(Continued)

*Primary Examiner* — Ping Y Hsieh
(74) *Attorney, Agent, or Firm* — Harness, Dickey & Pierce, P.L.C.

(57) ABSTRACT

The invention relates to an apparatus and a method for determining a defocussing value ($\Delta z$, $\Delta z_1$, $\Delta z_2$) for at least one image feature in an image, wherein at least one monochromatic image of an object is generated, wherein the defocussing value ($\Delta z$, $\Delta z_1$, $\Delta z_2$) is determined on the basis of the image and depending on the wavelength ($\lambda$) of the monochromatic image, and a method and apparatus for image-based determination of a dimensional size.

13 Claims, 3 Drawing Sheets

(56) References Cited

U.S. PATENT DOCUMENTS

| | | |
|---|---|---|
| 6,999,175 B2 | 2/2006 | Ivarsson |
| 7,081,958 B2 | 7/2006 | Ivarsson |
| 7,262,866 B2 | 8/2007 | Ivarsson |
| 7,460,236 B2 | 12/2008 | Ivarsson |
| 2003/0067612 A1* | 4/2003 | Ivarsson ............ G01B 11/0625 356/600 |
| 2005/0007605 A1 | 1/2005 | Ivarsson |
| 2005/0062957 A1* | 3/2005 | Nugent .................... G01J 9/00 356/121 |
| 2006/0072115 A1 | 4/2006 | Ivarsson |
| 2007/0013912 A1 | 1/2007 | Ivarsson |
| 2008/0030738 A1 | 2/2008 | Ivarsson |
| 2012/0027289 A1 | 2/2012 | Naruse et al. |
| 2012/0027307 A1 | 2/2012 | Naruse |
| 2013/0308018 A1 | 11/2013 | Sasaki |
| 2014/0367555 A1* | 12/2014 | Motomura ........... G02B 21/367 250/208.1 |
| 2015/0125070 A1 | 5/2015 | Atif et al. |
| 2016/0125611 A1* | 5/2016 | Komatsu .................. G06T 7/55 348/135 |
| 2017/0168282 A1* | 6/2017 | Lawson .................... G06T 7/73 |

FOREIGN PATENT DOCUMENTS

| | | |
|---|---|---|
| GB | 2 058 344 A | 4/1981 |
| JP | 3845354 | 8/2006 |
| JP | 3922784 | 3/2007 |
| JP | 2007-240197 | 9/2007 |
| JP | 4016403 | 9/2007 |
| JP | 4097038 | 3/2008 |
| JP | 4132308 | 6/2008 |
| JP | 4147759 | 7/2008 |
| JP | 4251980 | 1/2009 |
| JP | 2009-192296 | 8/2009 |
| JP | 2012-32341 | 2/2012 |
| JP | 2012-37257 | 2/2012 |
| WO | 00/02007 | 1/2000 |
| WO | 2009/141403 A1 | 11/2009 |
| WO | 2013/156101 A9 | 10/2013 |

OTHER PUBLICATIONS

J. Garcia et al.; Chromatic Aberration and Depth Extraction; 2000; pp. 762-765.

H.J. Tiziani et al.; Three-dimensional image sensing by chromatic confocal microscopy; Oct. 1992; pp. 1838-1843.

M. Atif; Optimal Depth Estimation and Extended Depth of Field from Single Images by Computational Imaging using Chromatic Aberrations; Oct. 2013; 137 pp.

* cited by examiner

METHOD AND APPARATUS FOR DETERMINING A DEFOCUSING VALVE AND FOR IMAGE-BASED DETERMINATION OF A DIMENSIONAL SIZE

CROSS-REFERENCE TO RELATED APPLICATION

The present application claims priority under 35 U.S.C. § 119 to German national application, No. 10 2016 203 275.5, filed Feb. 29, 2016, the entire contents of which are incorporated herein by reference.

BACKGROUND OF THE INVENTION

The invention relates to a method and an apparatus for determining a defocussing value, and a method and an apparatus for image-based determination of a dimensional size.

So-called profile projectors, which constitute an optical measuring system, in which an object is illuminated in transmission or reflection, are known. A shadow image or reflection image of the object is imaged on a sensor by way of an optical system, said image, as a rule, having been reduced in size. Dimensional sizes, in particular object dimensions, may be ascertained on the basis of the image generated in this way, in particular through knowledge of the imaging scale. Optical systems, in particular objectives, which ensure a constant imaging dimension over a certain range in the position of the object relative to the optical system are required in such profile projectors. Firstly, this allows measurement of three-dimensional objects, in which the effective imaging scale does not vary in depth. Secondly, such optical systems are less sensitive to defocussing. By way of example, this is described in: "Atif, M.; Optimal Depth Estimation and Extended Depth of Field from Single Images by Computational Imaging using Chromatic Aberrations; Heidelberg: Ruperto-Carlo University of Heidelberg, Germany, 2013". Therefore, as a rule, use is made of optical systems with a so-called telecentric objective, which is distinguished by virtue of the chief rays of all image points extending parallel to the optical axis of the optical system to the greatest possible extent.

However, in reality, such telecentric optical systems are only telecentric for a specific wavelength. The finite selection of lens materials and production tolerances lead to a deviation from the ideal telecentricity, the so-called telecentric error. On account of this telecentric error, the chief rays do not extend exactly parallel to the optical axis of the optical system; instead, they include an angle φ therewith, the value of said angle as a rule depending on the considered field point $x_F$ and the employed wavelength, i.e. $\varphi=\varphi(\lambda,x)$. Here, the field point $x_F$ denotes a spatial point. This telecentric error φ leads to an optical aberration, depending on the defocussing Δz and the wavelength, of object features, wherein said optical aberration may be described by $$\Delta x = f(\lambda, x_F), \Delta z) \qquad \text{Formula 1}$$

as the difference between the theoretically correct position in the image and the actual incorrect position in the image. In the vicinity of a wavelength-dependent focal plane of the optical system, a linear approximation of the optical aberration in accordance with $$\Delta x = \varphi(\lambda, x_F) \Delta z \qquad \text{Formula 2}$$

is a sufficiently good approximation for a specific wavelength.

The telecentric error of commercially available objectives lies at several 1E-6 rad. This value can only be reduced further with extremely high design and manufacturing outlay, which would lead to excessively high costs of the objectives.

In accordance with formulae 1 and 2, a high measurement accuracy may be achieved despite a telecentric error if the so-called defocussing value Δz of the image feature and the telecentric error are known. In this case, a correction value of the order of the optical aberration may be determined and used to correct the position in the image and/or correct the dimensional size determined on the basis of the image.

The telecentric error may be ascertained relatively easily. Either it may be determined from the design parameters of the optical system, in particular of the objective, or it may be determined, in particular retrospectively, by calibrating the optical system, i.e. measuring a known object for various defocussing values and wavelengths.

US 2013/0308018 A1 discloses an image processing device comprising a capturing device configured to subdivide an image into a multiplicity of portions and determine an object distance and a defocussing value for each portion. The defocussing value for a portion is determined by virtue of determining a difference between a distance from an object imaged in the portion and a distance from a main object imaged in a different portion. Here, distances denote distances of the object from an optical system. The distances are captured in a focus scanning procedure. Further, the main object is arranged in a focal plane. Consequently, the document does not disclose an image-based determination of the defocussing value.

WO 2009/141403 A1 discloses a technique for removing effects of a lateral chromatic aberration. The document discloses no determination of a defocussing value.

However, a technical problem arising is that of developing a method and an apparatus for determining a defocussing value, which facilitate a determination which is exact and easy to implement from a computational point of view. Further, another technical problem arising is that of developing a method and an apparatus for image-based determination of a dimensional size, which facilitate an accurate determination of the dimensional size.

SUMMARY OF THE INVENTION

A method for determining a defocussing value of an optical system is proposed. The optical system may comprise at least one objective or consist of one objective. The optical system or the objective may comprise one or more lenses. The focal state and/or the numerical aperture of the optical system may be changeable.

For an object feature that is imaged into an image feature, the term "defocusing value" specifies a distance between the object feature and a system-specific reference plane. This distance may be measured along an optical axis of the optical system. Here, the reference plane may be a focal plane, in particular a wavelength-dependent focal plane, of the optical system. However, alternatively, the reference plane may also denote a plane which is predetermined by the manufacturer of the optical system, for example a plane in which the telecentric error is minimal for a plurality of wavelengths.

Also, the reference plane may be defined as a plane which is oriented perpendicular to the optical axis of the objective and which is at a distance from a reference surface at the objective, in particular a reference surface physically embodied by the objective, with a predetermined distance along said axis. The predetermined distance of this optical reference plane from the reference surface at the objective may correspond to a theoretical or measured working distance of the objective. By way of example, the reference surface may correspond to a surface, in which a vertex of a lens of the objective is arranged, wherein the surface may be oriented perpendicular to the optical axis of the lens. Alternatively, the reference surface may be a surface which serves for mounting or placing the object on a holding structure.

Here, the defocussing value may be determined for at least one image feature, the image feature referring to the imaged object feature, i.e. the image of the object feature. As will still be explained in more detail below, the image feature may be an imaged object edge in particular. An image feature may comprise one or more image points. The defocussing value is determined on the basis of an image of the object. Expressed differently, the defocussing value is determined on the basis of an image.

Here, the image may be generated by means of an image sensor. The image sensor may be a CCD sensor or a CMOS sensor. In particular, the image sensor may comprise a so-called array, in particular a colour filter array.

Here, the object may be imaged onto the image sensor by means of the optical system. Further, it is possible to illuminate the object by means of at least one illumination device. Here, the object may be illuminated in a transmitted-light scenario or in a reflected-light scenario. By way of example, the object may be arranged on an object table which, in particular, may also be transparent.

Further, it is possible to illuminate the object under white light or with light with a specific wavelength or with light with a specific spectrum, which may comprise one or more wavelengths.

Here, in particular, the image sensor may be a so-called RGB sensor.

According to the invention, at least one monochromatic image of the object is generated. By way of example, the monochromatic image may be generated by virtue of the object being illuminated in monochromatic fashion, i.e. by only one specific wavelength. Alternatively, the monochromatic image may be generated by virtue of the object being illuminated by a plurality of wavelengths, in particular by white light, with the polychromatic image generated under this illumination being filtered in terms of colour. Hence, portions of a specific wavelength, in particular, may be determined in the polychromatic image generated thus.

Further, the defocussing value is determined on the basis of an image. In particular, this may mean that at least one property of the image feature is determined in the monochromatic image, with the defocussing value being determined depending on the property and the wavelength of the monochromatic image. By way of example, the property may be a dimension of the image feature, for example a width or length, or an image position of the image feature in the image. Here, the wavelength of the monochromatic image denotes the wavelength of the light used to generate the image.

The defocussing value being determined depending on the wavelength may mean that the wavelength is taken into account quantitatively and/or computationally when determining the defocussing value. However, this is not mandatory. The defocussing value being determined depending on the wavelength may also mean that the defocussing value is determined on the basis of the image generated with this wavelength, in particular depending on a property of an image feature of such an image.

In particular, it may be possible that different defocussing values exist for different wavelengths, in particular if the reference plane denotes a (wavelength-dependent) focal plane of the optical system.

The defocussing value determined thus advantageously facilitates a more accurate determination of an optical aberration depending on the defocussing. In particular, it is also possible to determine the optical aberration depending on the telecentric error and the defocussing value, and hence correct a position in the image and/or a measurement result. By way of example, determining the optical aberration is described in formulae 1 and 2 and the corresponding parts of the description. As a result of this, it is possible to improve the measurement accuracy, i.e. an accuracy when determining dimensional sizes on the basis of an image.

In particular, the defocussing value may be determined as proposed. In turn, the telecentric error may be determined from design-specific parameters of the optical system or ascertained by calibration, as explained above.

A dimension of the image feature is determined in the monochromatic image in a further embodiment. In particular, a dimension of the image feature may be a length, width, a diameter or a further geometric size of the image feature. As will still be explained in more detail below, the image feature preferably is an imaged object edge. In this case, the dimension may be an edge width in particular. The dimension may be determined on the basis of image points, or else depending on an imaging scale, known in advance, when generating the image.

By way of example, an edge width may be determined by virtue of an edge profile, i.e. a direction of the edge, being determined in the image at a predetermined, in particular characteristic point of the edge. Following this, it is possible to determine an intensity curve in a direction perpendicular to the direction of the edge. Further, it is possible to determine a derivative of the intensity curve. The derivative may have a substantially Gaussian curve. Then, an edge width may correspond to, for example, a standard deviation or a full width at half maximum of the Gaussian curve. However, naturally, a person skilled in the art is aware of further methods for determining the edge width.

It may be assumed that the defocussing leads to an increase in the dimension of the imaged object feature (image feature). This increase may be different for different wavelengths. In particular, the imaged object feature may have a minimal dimension in the image if it is arranged in the reference plane. The dimension may increase if the object feature is arranged above or below the reference plane.

The dependence of the dimension of the image feature, in particular a maximum width or a maximum diameter of the image feature, on the distance from the reference plane may be a functional dependence. In particular, the functional dependence may be a quadratic dependence. By way of example, it may be specified by $$w(\Delta z) = w_0 \cdot \sqrt{1 + (\Delta z/z_0)^2},\qquad \text{Formula 3}$$

where w denotes the dimension of the image feature depending on a distance $\Delta z$, i.e. on the defocussing value, from the reference plane. Here, $w_0$ denotes the dimension of an imaged, minimum light beam diameter, which is achieved at the position $\Delta z=0$, i.e. in the reference plane. The value $z_0$ may be determined by $$z_0 = \frac{\pi w_0^2}{\lambda} \qquad \text{Formula 4}$$

and is referred to as the Rayleigh length. The value $w_0$ may be determined from the numerical aperture of the imaging objective and the wavelength, or may be determined by calibration.

The following approximation of Formula 3 may be provided for small distances from the reference plane by carrying out Taylor series expansion of Formula 3

$$w(\Delta z) = w_0 \times (1 + 0.5 \cdot (\Delta z/z_0)^2) \quad \text{Formula 5}$$

Hence, depending on the functional relationship, the defocussing value $\Delta z$ may be determined depending on the dimension w determined on the basis of an image. If use is made of e.g. Formula 5, an absolute value of the defocussing value $\Delta z$ may be determined directly.

Thus, in this case, a dimension of the image feature may be determined in the monochromatic image, with an absolute value of the defocussing value then being determined depending on the dimension. The reference plane may be a wavelength-dependent focal plane of the optical system in this case in particular.

Here, the absolute value of the defocussing value may be sufficient to determine the optical aberration specified in Formulae 1 and 2.

In a further embodiment, a first monochromatic image is generated with a first wavelength and at least one further monochromatic image is generated with a further wavelength. Here, the first wavelength differs from the further wavelength.

Further, a first dimension of the image feature is determined in the first image. Further, a further dimension of the image feature is determined in the further image. The first dimension and further dimension may be corresponding dimensions. By way of example, this may mean that the width of the image feature is determined in each case in the first image and in the further image. Further, the defocussing value is determined depending on the first dimension and the further dimension.

In particular, a first defocussing value $\Delta z_1$ may be determined depending on the first dimension, with this defocussing value denoting a distance from a focal plane of the optical system for the first wavelength. If the first defocussing value $\Delta z_1$ is determined in accordance with e.g. Formula 5, the first defocussing value $\Delta z_1$ may be an absolute value. Accordingly, it is possible to determine a second defocussing value $\Delta z_2$ or an absolute value, which corresponds to the distance from a focal plane of the optical system for the further wavelength.

A position of the wavelength-dependent focal planes, in particular a position along the optical axis, may be known relative to the optical system as a result of calibration or depending on design parameters of the optical system. Hence, depending on the first defocussing value $\Delta z_1$ and the further defocussing value $\Delta z_2$, it is also possible to determine a sign of the deviation from the respective wavelength-dependent focal plane. Thus, in particular, it is possible to determine whether the imaged object feature lies above or below the respective wavelength-dependent focal plane.

In particular, the signs on the defocussing values $\Delta z1$, $\Delta z2$ may be determined in such a way that the difference between the sum of the position of the first wavelength-dependent focal plane and the first defocussing value $\Delta z1$ and the sum of the position of the further wavelength-dependent focal plane and the further defocussing value $\Delta z2$ is minimized.

Depending on one or both defocussing values $\Delta z1$, $\Delta z2$, it is also possible to determine an elevation of the imaged object feature, i.e. a distance from the optical system parallel to the optical axis.

Determining the defocussing value depending on the dimension of an image feature may also be referred to as determining the defocussing value depending on a longitudinal chromatic aberration of the optical system. The longitudinal chromatic aberration in this case generates the described increase in the dimension of the imaged object features.

In an alternative embodiment, a first monochromatic image is generated with a first wavelength and at least one further monochromatic image is generated with a further wavelength. Further, a first image position of the image feature is determined in the first monochromatic image. By way of example, the image position may be determined as a position in an image coordinate system, i.e. a two-dimensional coordinate system. By way of example, the image position may correspond to the position of a reference point of the image feature, for example a central point. Further, a further image position of the image feature is determined in the further monochromatic image.

Further, the defocussing value is determined depending on a difference between the first image position and the further image position.

This determination may also be referred to as the determination of the defocussing value dependent on a lateral chromatic aberration of the optical system. It generates a so-called lateral optical aberration which leads to a displacement in position of the image feature in the case of imaging at various wavelengths. Here, the displacement in position, i.e. the difference between image positions of the image feature, in the case of imaging at various wavelengths depends on the defocussing.

Hence, the image position may be described as $$x = g(\Delta z, \lambda) \quad \text{Formula 6}$$

in the form of a functional dependence on the defocussing value of the image feature and the wavelength $\lambda$. This description is equivalent to the wavelength-dependent optical aberration described in Formulae 1 and 2.

Hence, the image position of the image feature may also be determined as $$x = x_0 + \varphi(x_0, \lambda) \cdot \Delta z \quad \text{Formula 7}$$

in an approximate fashion. Here, $\varphi$ denotes the telecentric error explained at the outset. As explained above, the latter may be determined by calibration of the optical system or depending on production parameters of the optical system.

By way of example, depending on Formula 7, the defocussing value may be determined as outlined below. Thus, a first image position $$x_1 = g(\Delta z, \lambda_1) = g_1(z) \quad \text{Formula 8}$$

may be determined in the first monochromatic image at a first wavelength $\lambda_1$ and a further image position $$x_2 = g(\Delta z, \lambda_2) = g_2(\Delta z) \quad \text{Formula 9}$$

may be determined in the further monochromatic image at a further wavelength $\lambda_2$. Here, the defocussing value $\Delta z$ may refer to the distance from a wavelength-independent reference plane and therefore likewise be wavelength-independent. However, the reference plane may be one of the wavelength-dependent focal planes straightaway.

Here, the function g may be known in advance or determined in trials. By way of example, a linear approximation may also be assumed, namely:

$$g_1(\Delta z)=x_0+\varphi(x_0,\lambda_1)\cdot\Delta z \quad \text{Formula 10}$$

and $$g_2(\Delta z)=x_0+\varphi(x_0,\lambda_2)\cdot\Delta z \quad \text{Formula 11}$$

Then, $$\Delta x=x_1-x_2=\varphi(x_0,\lambda_1)\cdot\Delta z-\varphi(x_0,\lambda_2)\cdot\Delta z \quad \text{Formula 12}$$

may be determined as difference. Hence, $$\Delta z=\Delta x/(\varphi(x_0,\lambda_1)-\varphi(x_0,\lambda_2)) \quad \text{Formula 13}$$

may be determined as the defocussing value. In the case of a non-linear relationship, $$\Delta z=g_n^{-1}(\Delta x) \quad \text{Formula 14}$$

may be determined, where $g_n(\Delta z)=x_1-x_2$ denotes a functional description.

As a result of this, a reliable and accurate determination of the defocussing emerges in an advantageous manner.

In a further embodiment, the defocussing value is determined additionally depending on a telecentric error. This was explained above. Here, the telecentric error may be spatially dependent, in particular depending on an elevation of the imaged object feature and depending on a spatial position in a plane perpendicular to the optical axis of the optical system. As explained above, the telecentric error may be determined by calibration or depending on production parameters of the optical system. This advantageously facilitates a more accurate determination of the defocussing value.

The image feature is an edge in a preferred embodiment. An edge may be detected by means of a method for edge detection, known to a person skilled in the art. By way of example, but not exclusively, use may be made of the so-called Canny algorithm for detecting an edge in the image.

Further, a method for image-based determination of a dimensional size of an object is proposed. In particular, a dimensional size may denote a distance, a length, a diameter or a further geometric size or dimension of the object. In particular, a dimensional size may also denote a distance between two object features, for example between two edges.

In particular, the method may serve for optically measuring the object.

Here, the dimensional size is determined on the basis of an image or depending on an image of the object. To this end, an imaging scale of the image may be known in advance as a result of calibration.

At least one monochromatic image of the object is generated in the method. This was already explained above. Further, at least one image feature is determined in the image. In particular, at least one edge may be determined in the image. To this end, use may be made of methods, known to a person skilled in the art, for detecting image features.

Further, a defocussing value of the image feature is determined in accordance with one of the embodiments described in this disclosure. Further, the dimensional size is determined on the basis of an image and depending on the defocussing value. In particular, the dimensional size may also be determined depending on a known imaging scale.

As explained above, the defocussing may be used to determine an optical aberration of an imaged object feature. Then, this optical aberration may be taken into account in the image-based determination of the dimensional size.

Further, a distance between the imaged object feature and the optical system may also be determined depending on the defocussing value. This distance may also be referred to as elevation. In particular, the distance may be determined as a sum of the distance of the reference plane from the optical system, known in advance, and the defocussing value. In turn, this distance may then be used to determine a dimensional size of the object or may then represent a dimensional size of the object. By way of example, the difference between elevations of various imaged object features may be determined, as a result of which it is possible to determine a dimension of the object along, or parallel to, the optical axis of the optical system.

Advantageously, the method facilitates an accurate determination of the dimensional size being facilitated. In particular, an optical aberration depending on the defocussing value and the telecentric error (see Formulae 1 and 2) may be compensated for as completely as possible.

In a further embodiment, a position correction value for the at least one image feature is determined depending on the defocussing value. Further, the image position of the image feature is corrected depending on the position correction value and hence a corrected image position is determined. By way of example, the position correction value may be added to the image position of the image feature. Further, the dimensional size is determined depending on the corrected image position of the image feature.

By way of example, if the distance between two image features, for example two edges, is intended to be determined, a position correction value may be determined in each case for the first edge and for the further edge. The distance between the image features may then be determined as or depending on the difference of the corrected image positions of the image features.

It is possible that a position correction value is determined for a plurality of monochromatic images, with the various monochromatic images being generated at mutually different wavelengths.

Then, a polychromatic image may be generated depending on the position correction values determined for the various wavelengths, with the image position of the image feature in the polychromatic image being generated depending on the image position of the image feature in the respective monochromatic images and the corresponding position correction values in the individual monochromatic images. Also, the image position of the image feature in the polychromatic image may be generated depending on the corrected image positions in the respective monochromatic images.

By way of example, a mean value or a weighted mean value of the corrected image positions of the image feature in a monochromatic image may be determined as image position in the polychromatic image. Expressed differently, corrected image positions of the image feature may be interpolated onto a reference image. The reference image may be the polychromatic image. Then, it is possible to determine the dimensional size on the basis of the polychromatic image. By way of example, it is possible to determine two image features in the polychromatic image and their corresponding image positions, wherein a distance of the image features may be determined as a difference or depending on the difference of the respective image positions.

Advantageously, an accurate determination of the dimensional size emerges as a result thereof.

In an alternative embodiment, an uncorrected dimensional size is determined depending on the image position and/or the dimension of the image feature. To this end, the image position and/or the dimension of the image feature may be determined based on an image, as explained above. By way of example, it is possible to determine image positions of two different image features and determine a distance as difference of these image positions as an uncorrected dimensional size.

Further, the uncorrected dimensional size is corrected depending on the defocussing value. By way of example, an optical aberration may be determined depending on the defocussing value. Here, the optical aberration may be determined e.g. in the form of a pixel displacement and a correction value depending on this pixel displacement may be determined.

Then, this correction value may be e.g. added to the uncorrected dimensional size or subtracted from the latter.

If the dimensional size is determined depending on image positions of a plurality of image features, these image features may be determined in mutually different monochromatic images, i.e. images generated at different wavelengths. By way of example, a first image feature may be determined in a monochromatic image generated at a first wavelength. Further, it is possible to determine a first defocussing value of this image feature and a correction value, depending thereon, for the dimensional size. Further, it is possible to determine an image position of a further image feature in a further monochromatic image and a defocussing value of this further image feature and a correction value depending thereon.

Further, the dimensional size may then be determined depending on the corresponding image positions and the correction values. Advantageously, the exact determination of the dimensional size between object features, which are imaged with different defocussing values and/or at different wavelengths, emerges as a result thereof.

In a further embodiment, the dimensional size is determined additionally depending on a telecentric error. In particular, it is possible to determine a position correction value or a correction value, depending on the defocussing value, in accordance with Formula 1 or Formula 2. To this end, it is necessary to know the telecentric error. As already explained above, the latter may be determined depending on production parameters or depending on a calibration.

Advantageously, an accuracy of the dimensional size increases as a result thereof.

Further, an apparatus for determining a defocussing value for at least one image feature in an image is proposed. Advantageously, a method for determining the defocussing value, as explained in this disclosure, can be carried out here by means of the apparatus. The apparatus comprises at least one evaluating device.

By means of the evaluating device, the defocussing value is determinable, according to the invention, based on an image and depending on the wavelength of the monochromatic image. Here, the evaluating device may be embodied as a computing device, in particular as a microcontroller, or may comprise the latter.

The apparatus may also comprise a memory device for storing images, a memory device for storing the wavelength and a memory device for storing the defocussing value.

Here, the evaluating device may have an interface for transferring image data and for transferring information in respect of the wavelength(s) for generating the image data. Further, the evaluating device may comprise an output interface for outputting the defocussing value. The steps required for determining the defocussing value may be carried out by means of the evaluating device. Hence, the evaluating device is embodied in such a way that the determination of the defocussing value in accordance with one of the embodiments described in this disclosure is possible by means of the evaluating device.

Further, an apparatus for image-based determination of a dimensional size of an object is proposed. The apparatus comprises at least one image capturing device, at least one optical system and at least one evaluating device in accordance with an embodiment as described in this disclosure. Further, the apparatus may comprise a memory device for the dimensional size(s) and/or an output interface for outputting the dimensional size.

In particular, the optical system may comprise at least one objective or may be embodied as an objective. An image of the object is generable by means of the image capturing device. Further, an image-based determination of a dimensional size of the object in accordance with one of the embodiments described in this disclosure can be carried out by means of the evaluating device.

In particular, at least one monochromatic image of the object is generable by means of the apparatus, with at least one image feature being determinable in the image, with, further, a defocussing value of the image feature being determinable and with the dimensional size being determinable depending on the defocussing value. Hence, the apparatus is embodied in such a way that a method for image-based determination of the dimensional size of the object in accordance with one of the embodiments described in this disclosure can be carried out by the apparatus.

The image of the object may be generated as a monochromatic image or as a polychromatic image. If a polychromatic image is generated by means of the image capturing device, the polychromatic image may be filtered in order to generate a monochromatic image. To this end, the apparatus may comprise at least one filter device, in particular at least one colour filter device.

Further, the apparatus may comprise an object table, with the object being arrangeable on the object table. Further, the apparatus may comprise at least one illumination device. In particular, the object table may be at least partly transparent.

The illumination device may be embodied and/or arranged for producing a transmitted-light image or a reflected-light image.

Further, a relative position between the optical system and the object table may be changeable. In this case, in particular, the apparatus may comprise a positioning device for the object table and/or a positioning device for the optical system.

In a further embodiment, the objective has a set longitudinal chromatic aberration and/or a set lateral chromatic aberration. Here, the set aberration may be set, for example, during the theoretical design of the objective. Hence, the quantitative value of the aberration may be known in advance.

Here, the longitudinal chromatic aberration denotes the deviation of the focal plane from the reference planes. The longitudinal aberration differs for different wavelengths. This aberration may be specified in millimetres. This deviation may be proportional to the spread of an image feature which images an object feature arranged in the focal plane in relation to an image feature which images an object feature arranged in the reference plane. The deviation may be different for different wavelengths.

Here, a lateral chromatic aberration denotes an image-position displacement between an image position of the image feature which images an object feature arranged in the reference plane and the image position in the actual image. This position displacement may be different for each wavelength. Additionally, the image-position displacement may be dependent on a distance of the object feature from the optical axis along a direction perpendicular to this optical axis. In particular, the displacement may increase for larger distances.

The lateral chromatic aberration may be specified in percent as a ratio to the image height.

Advantageously, this results in an accurate determination of the dimensional size for a polychromatic image. This is because this allows the defocusing value to be determined namely depending on the set chromatic aberration or the known aberration on the basis of an image, e.g. depending on an edge width or a colour fringe profile. If the defocussing value is known, it is also possible to determine the telecentric error, in particular if, as explained above, the objective was measured accordingly or a corresponding calibration was carried out.

Then, as explained above, a position correction value or a correction value depending on the defocussing value in accordance with Formula 1 or Formula 2 may be determined depending on the defocussing value and the telecentric error, as a result of which, in turn, an accuracy in the image-based determination of the dimensional size is increased.

BRIEF DESCRIPTION OF THE DRAWINGS

The invention will be explained in more detail on the basis of an exemplary embodiment. In the figures.

DETAILED DESCRIPTION OF THE PREFERRED EMBODIMENTS

Figure 1:
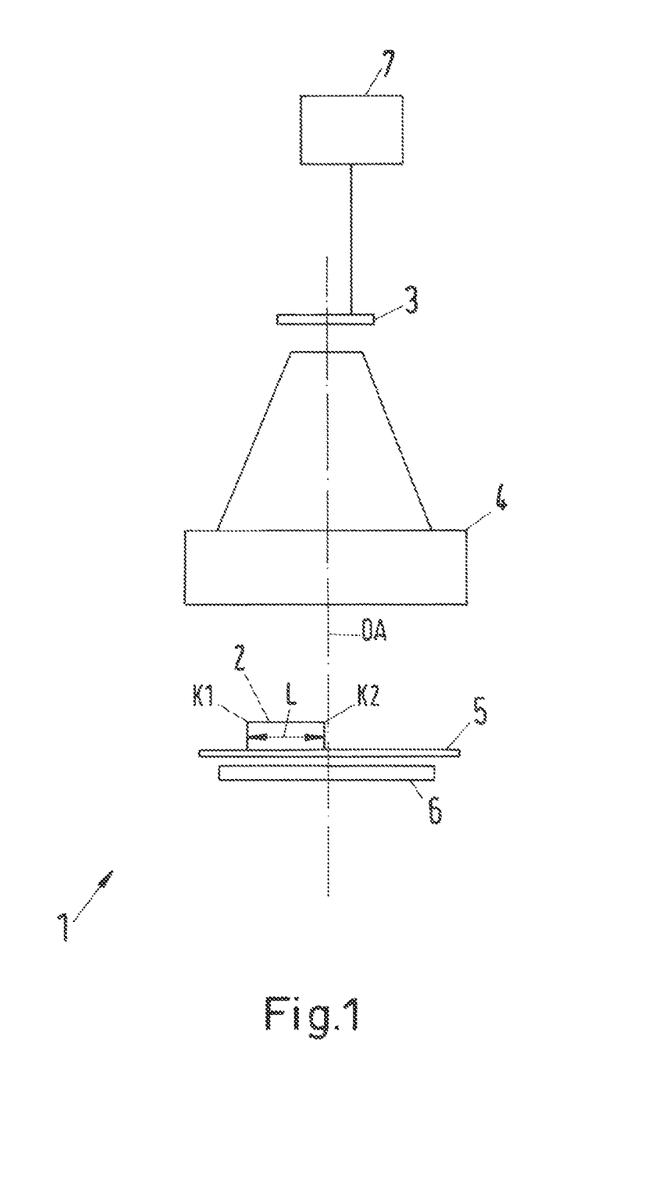
FIG. 1 shows a schematic block diagram of an apparatus according to the invention.

FIG. 1 shows a schematic illustration of an apparatus 1 according to the invention for image-based determination of a dimensional size of an object 2. The apparatus 1 comprises at least one image capturing device embodied as an image sensor 3. Further, the apparatus 1 comprises an optical system embodied as an objective 4. Further, the apparatus 1 comprises a transparent object table 5 and an illumination device 6. Here, the illumination device 6 is able to generate monochromatic light. However, it is also possible that the illumination device generates light with a non-monochromatic spectrum, for example with a desired broadband or narrowband spectrum. The illuminated object 2 on the object table 5 is imaged onto the image sensor 3 by means of the objective 4. Further, an optical axis OA of the optical system is depicted.

Further, the apparatus 1 comprises an evaluating device 7 which is signal connected and/or data connected to the image sensor 3.

An image-based determination of a dimensional size of the object 2, for example an image-based determination of a length L of the object 2, can be carried out by means of the evaluating device 7. To this end, the evaluating device 7 may determine a defocussing value $\Delta z$ (see e.g. FIG. 3) on the basis of an image. Here, in particular, the defocussing value $\Delta z$ may be determined depending on the image generated by the image sensor 3 and depending on a wavelength with which the image was generated.

In particular, the defocussing value $\Delta z$ may be determined for an imaged object edge K1, K2. In this case, the image feature corresponds to an edge in the image. The latter may be detected with methods known to a person skilled in the art.

By way of example, it is possible to generate a monochromatic image. To this end, the object 2 may, for example, be illuminated in monochromatic fashion. Alternatively, the image sensor 3 may generate a monochromatic image for a specific wavelength. Alternatively, the image generated by the image sensor 3 may be subjected to colour filtering, for example by the evaluating device 7 or a further filter device (not depicted here), in order to filter portions with a specific wavelength out of the image.

Then, the imaged first object edge K1 and the imaged further object edge K2 may be detected in the monochromatic image.

In a first alternative, an edge width of the imaged first object edge K1 and an edge width of the further imaged object edge K2 may be determined in the monochromatic image.

Further, the defocussing value $\Delta z$ may be determined depending on the edge width for each one of the imaged object edges K1, K2. This will be explained in even more detail below.

Further, it is possible to determine the edge widths in a plurality of monochromatic images which were generated with mutually different wavelengths.

Advantageously, this results in more accurate determination of the defocussing value $\Delta z$ for the imaged object edges K1, K2. In particular, the wavelength-dependent position of a focal plane, depicted schematically in FIG. 2, may be taken into account.

Figure 2:
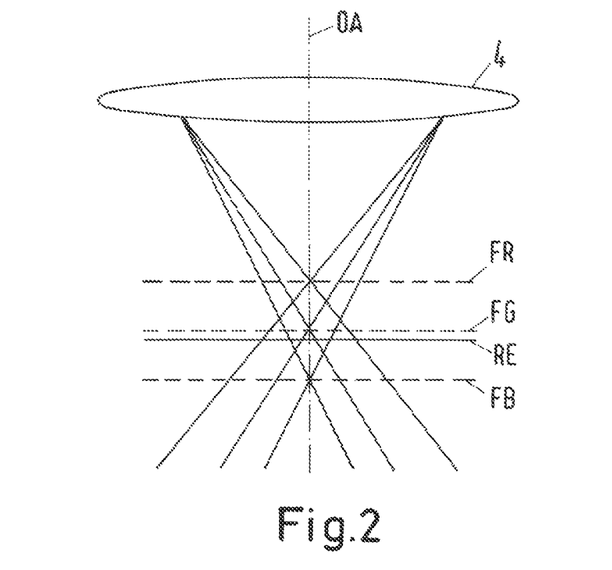
FIG. 2 shows a schematic illustration of wavelength-dependent focal planes.

FIG. 2 schematically depicts various focal planes FR, FG, FB of an objective 4 for various wavelengths.

Thus, a first focal plane FR denotes a focal plane of the objective 4, for example for red light, i.e. light with a wavelength of 630 nm or approximately 630 nm. Further, a second focal plane FG denotes a focal plane of the objective 4, for example for green light, i.e. light with a wavelength of 550 nm or approximately 550 nm. Further, a third focal plane FB denotes a focal plane of the objective 4, for example for blue light, i.e. light with a wavelength of 470 nm or approximately 470 nm. Further, a reference plane RE of the objective 4 is depicted; by way of example, it is specified by a producer of the objective 4. In particular, the reference plane may correspond to one of the focal planes.

It is possible to see that the focal planes FR, FG, FB and the reference plane RE have different distances from the objective 4 along the optical axis OA of the objective 4 in each case, i.e. they have various elevations. These distances may be known in advance, for example from a calibration. However, this means that an image feature in each case has a different defocussing value $\Delta z$ in monochromatic images which differ from one another, for example in an image generated with green light, with red light or with blue light.

The sequence of the focal planes along the optical axis OA for various wavelengths is determined by the optical design of the imaging objective 4. Hence, the sequence and/or distance conditions may naturally also differ from the sequence and/or distance conditions shown in FIG. 2.

Figure 3:
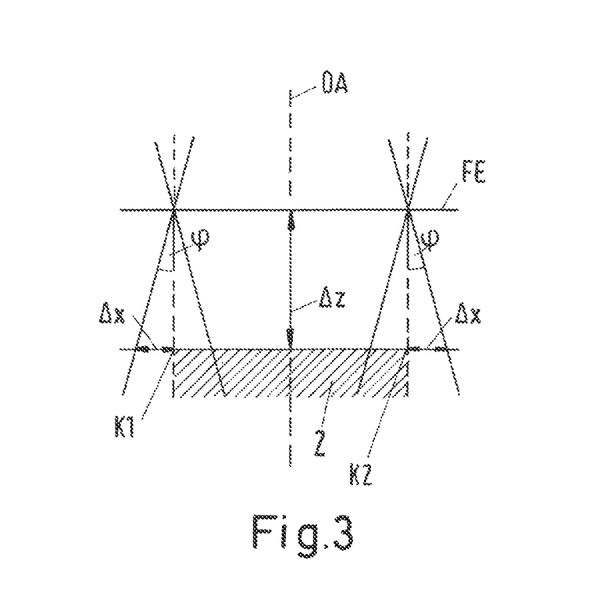
FIG. 3 shows a schematic illustration of an optical aberration.

FIG. 3 schematically depicts an optical aberration $\Delta x$ depending on a defocussing value $\Delta z$.

An object 2 with two object edges K1, K2 is depicted. Further, a focal plane FE is depicted; it may correspond to, for example, one of the focal planes FR, FG, FB depicted in FIG. 2.

Depicted further is a distance of the object edges K1, K2 along an optical axis of an objective 4, (see e.g. FIG. 2) from the focal plane FE. This distance corresponds to the defocussing value $\Delta z$.

Depicted further is an optical aberration $\Delta x$, which depends on the telecentric error $\varphi$ and the defocussing value $\Delta z$. The dependence is specified in Formula 1 as a functional dependence. In accordance with Formula 2, a linear approximation may be assumed in the vicinity of the focal plane FE. Instead of being imaged at a theoretically correct image position, the optical aberration $\Delta x$ leads to an edge being imaged at an image position which is displaced by $\Delta x$ or by a value depending on $\Delta x$ in relation to the theoretically correct image position.

Here, the telecentric error $\varphi$ may be determined by a calibration of the objective 4. Alternatively, the telecentric error $\varphi$ may be determined depending on production parameters of the objective 4.

Figure 4:
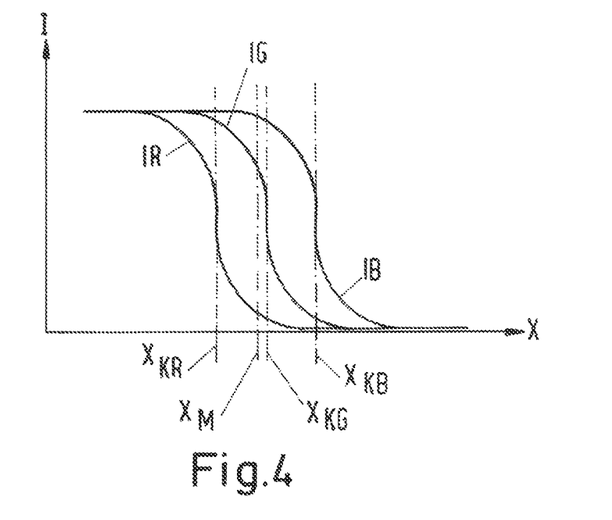
FIG. 4 shows a schematic intensity curve for an edge in an image for various wavelengths and FIG. 5 shows an exemplary functional relationship between an edge width and a defocussing.

FIG. 4 schematically shows intensity curves for an imaged object edge K1, K2 in various monochromatic images. A first intensity curve IR is an intensity curve along various image positions x in the region of an imaged object edge K1, K2 in a monochromatic image generated with red light. A further intensity curve IG shows an intensity curve for various image positions x in the region of an imaged object edge K1, K2 in a monochromatic image generated with green light. A third intensity curve IB is an intensity curve for various image positions x in a region of an imaged object edge K1, K2 in a monochromatic image generated with blue light.

Depicted further are edge positions xKR, xKG, xKB in the various monochromatic images, with the edge position xKR, xKG, xKB corresponding to a position of the point of inflection of the respective intensity curve IR, IG, IB. Further, an averaged edge position xM is depicted. The latter may be determined from the edge positions xKR, xKG, xKB determined in the respective monochromatic images by forming a weighted average. Thus, it is possible, for example, to determine a fusioned, polychromatic image depending on the monochromatic images, with an image position of the imaged object edge K1, K2 in the polychromatic image being assumed to be the averaged position xM.

FIG. 4 therefore depicts an effect of a lateral chromatic aberration error. The latter generates the various edge positions xKR, xKG, xKB, depicted in FIG. 4, for object edges K1, K2 with a constant spatial position on account of the various wavelengths which serve to generate the corresponding image.

The edge width in the image changes for various distances of the object edges K1, K2 from a focal plane FR, FG, FB as a result of the longitudinal chromatic error.

Figure 5:
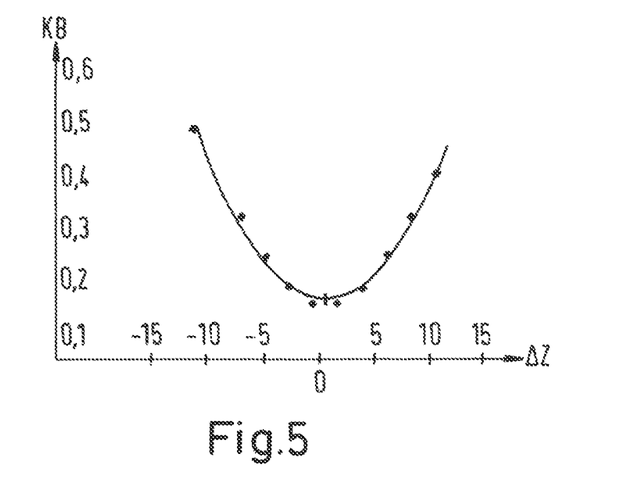

FIG. 5 schematically depicts a dependence of an edge width KB on a defocussing value $\Delta z$. The squares plot show individual measurement values of the edge width KB depending on the defocussing value $\Delta z$. It is possible to assume that a quadratic dependence exists between the defocussing value $\Delta z$ and the edge width KB, which is determined in a monochromatic image. This is depicted by a curve of best fit, which is plotted using a solid line.

By way of example, if a monochromatic image is generated with green light, at least one absolute value of the defocussing value $\Delta z$ may be determined depending on an edge width KB of an imaged object edge K1, K2. Hence, it is possible to determine the absolute value by which the object edge K1, K2 lies above or below the focal plane FG (see FIG. 2).

A further monochromatic image, for example with red light, may be generated in order to be able to determine a sign of the defocussing value. Once again, an edge width KB and an absolute value of the defocussing value $\Delta z$ may be determined in this further monochromatic image. If the distance of the various focal planes FR, FG, FB from the objective 4 along the optical axis OA is known, as depicted in FIG. 2, it is possible to determine both a sign and an absolute value for the defocussing value $\Delta z$ of the imaged object edge K1, K2 for both the first focal plane FR and the second focal plane FG, depending on the absolute values determined for the two wavelengths.

However, a defocussing value $\Delta z$ may likewise be determined depending on various edge positions xKR, xKG, xKB. In particular, it is possible to assume that the depicted ascertained edge positions xKR, xKG, xKB correspond to a sum of the theoretically correct edge position and an optical aberration, which depends on the telecentric error and on the defocussing value and which, for example, is specified in Formula 1 and Formula 2. By way of example, this dependence is specified in Formula 6 or Formula 7.

Accordingly, the defocussing value $\Delta z$ may be determined depending on the difference between two edge positions xKR, xKG, xKB and the telecentric error. By way of example, this determination is expressed by Formula 13 or Formula 14.

In particular, the defocussing value $\Delta z$ may be determined by the evaluating device 7 and may be used for image-based determination of a dimensional size of the object 2, for example the length L depicted in FIG. 1.

In so doing, it is possible, for example, to determine a defocussing value $\Delta z$ for the two imaged object edges K1, K2.

In a first alternative, a position correction value may be determined depending on the defocussing value $\Delta z$ for the image positions of the imaged object edges K1, K2, with the respective image position of the imaged object edge K1, K2 being corrected by means of the position correction value. Then, the length may be determined as difference between the corrected image position of the imaged further object edge K2 and the corrected image position of the imaged first object edge K1.

Alternatively, an uncorrected length may be determined as difference between an image position of the imaged further object edge K2 and the image position of the imaged first object edge K1. The image position of the imaged object edges K1, K2 may be determined in one monochromatic image or in various monochromatic images. Then, depending on the wavelength with which the monochromatic image was generated, a corresponding wavelength-dependent defocussing value $\Delta z$ may be determined for each imaged object edge K1, K2, wherein, then, an optical aberration may be determined in accordance with Formula 1 or Formula 2, depending on the wavelength-dependent defocussing value. These optical aberrations may then be used to correct the uncorrected length L.

LIST OF REFERENCE SIGNS

1 Apparatus
2 Object
3 Image sensor
4 Objective
5 Object table

6 Illumination device
7 Evaluating device
OA Optical axis
FR First focal plane
FG Second focal plane
FB Third focal place
RE Reference plane
φ Telecentric error
Δz Defocussing value
$Δz_1$ First defocussing value
$Δz_2$ Further defocussing value
Δx Optical aberration
FE Focal plane
K1 First object edge
K2 Further object edge
IR First intensity curve
IG Second intensity curve
IB Third intensity curve
$x_{KR}$ First edge position
$x_{KG}$ Second edge position
$x_{KB}$ Third edge position
$x_M$ Averaged edge position
KB Edge width
λ Wavelength
φ Telecentric error

The invention claimed is:

1. A method for determining a defocusing value ($Δz$, $Δz_1$, $Δz_2$) for an image feature in an image, the method comprising:
generating a monochromatic image of an object;
determining a wavelength (λ) of the monochromatic image; and
determining the defocusing value ($Δz$, $Δz_1$, $Δz_2$) based on the monochromatic image and the wavelength (λ),
wherein the wavelength is used quantitatively and/or computationally to determine the defocusing value.

2. The method according to claim 1, further comprising:
determining a dimension of the image feature in the monochromatic image,
wherein the defocusing value ($Δz$, $Δz_1$, $Δz_2$) is determined based on the dimension.

3. The method according to claim 2, further comprising:
generating a first monochromatic image with a first wavelength ($λ_1$);
generating a further monochromatic image with a further wavelength ($λ_2$);
determining a first dimension of the image feature in the first monochromatic image; and
determining a further dimension of the image feature in the further monochromatic image,
wherein the defocusing value ($Δz$, $Δz_1$, $Δz_2$) is determined based on the first dimension and the further dimension.

4. The method according to claim 1, further comprising:
generating a first monochromatic image with a first wavelength ($λ_1$);
generating a further monochromatic image with a further wavelength ($λ_2$);
determining a first image position of the image feature in the first monochromatic image; and
determining a further image position of the image feature in the further monochromatic image,
wherein the defocusing value ($Δz$, $Δz_1$, $Δz_2$) is determined based on a difference between the first image position and the further image position.

5. The method according to claim 4, wherein the defocusing value ($Δz$, $Δz_1$, $Δz_2$) is additionally determined based on a telecentric error (φ).

6. The method according to claim 1, wherein the image feature is an edge.

7. A method for image-based determination of a dimensional size of an object, the method comprising:
generating a monochromatic image of the object;
determining an image feature in the monochromatic image; and
determining a defocusing value ($Δz$, $Δz_1$, $Δz_2$) of the image feature in accordance with the method according to claim 1,
wherein the dimensional size is determined based on the defocusing value ($Δz$, $Δz_1$, $Δz_2$).

8. The method according to claim 7, further comprising:
determining a position correcting value for the image feature based on the defocusing value ($Δz$, $Δz_1$, $Δz_2$); and
correcting the image position of the image feature based on the position correcting value,
wherein the dimensional size is determined based on the corrected image position of the image feature.

9. The method according to claim 7, further comprising:
determining an uncorrected dimensional size based on the image position and/or the dimension of the image feature; and
correcting the uncorrected dimensional size based on the defocusing value ($Δz$, $Δz_1$, $Δz_2$).

10. The method according to claim 7, wherein the dimensional size is additionally determined based on a telecentric error (φ).

11. An apparatus for determining a defocusing value ($Δz$, $Δz_1$, $Δz_2$) for an image feature in an image, the apparatus comprising:
an evaluating device,
wherein the evaluating device is configured to:
generate a monochromatic image;
determine a wavelength (λ) of the monochromatic image; and
determine the defocusing value ($Δz$, $Δz_1$, $Δz_2$) is based on the monochromatic image and the wavelength (λ) of the monochromatic image, and
wherein the wavelength is used quantitatively and/or computationally to determine the defocusing value.

12. A system for image-based determination of a dimensional size of an object, the system comprising:
an image capturing device;
an optical system; and
the apparatus according to claim 11,
wherein the image capturing device is configured to generate an image of the object, and
wherein the evaluating device is configured to determine the dimensional size of the object based on the image from the image capturing device.

13. The system according to claim 12, wherein the optical system has a set longitudinal chromatic aberration and/or a set lateral chromatic aberration.

* * * * *

UNITED STATES PATENT AND TRADEMARK OFFICE
CERTIFICATE OF CORRECTION

PATENT NO. : 10,719,915 B2  
APPLICATION NO. : 15/439150  
DATED : July 21, 2020  
INVENTOR(S) : Philipp Jester et al.

Page 1 of 1

It is certified that error appears in the above-identified patent and that said Letters Patent is hereby corrected as shown below:

On the Title Page

Column 1, (54) Title, Line 2          "VALVE" should be --VALUE--

In the Specification

Column 1, Title, Line 2               "VALVE" should be --VALUE--

In the Claims

Claim 11, Column 16, Line 43          "is based" should be --based--

Signed and Sealed this  
Eighteenth Day of May, 2021

Drew Hirshfeld  
*Performing the Functions and Duties of the*  
*Under Secretary of Commerce for Intellectual Property and*  
*Director of the United States Patent and Trademark Office*